(12) United States Patent
Dayan et al.

(10) Patent No.: US 8,122,341 B1
(45) Date of Patent: Feb. 21, 2012

(54) SHARING GEOGRAPHICAL INFORMATION BETWEEN USERS

(75) Inventors: Tal Dayan, Los Gatos, CA (US); Max Ross, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1050 days.

(21) Appl. No.: 11/454,243

(22) Filed: Jun. 17, 2006

(51) Int. Cl.
*G06F 17/00* (2006.01)
*G01C 21/32* (2006.01)

(52) U.S. Cl. ......... 715/230; 715/764; 715/861; 701/208

(58) Field of Classification Search .......... 715/200–205, 715/226, 230–232, 234, 255, 256, 262, 273, 715/719, 720, 728, 760, 854, 855, 858
See application file for complete search history.

(56) References Cited

U.S. PATENT DOCUMENTS

| | | | | |
|---|---|---|---|---|
| 5,802,492 A * | 9/1998 | DeLorme et al. | ......... | 455/456.5 |
| 5,920,694 A * | 7/1999 | Carleton et al. | ............. | 709/205 |
| 5,987,380 A | 11/1999 | Backman et al. | | |
| 6,307,573 B1 * | 10/2001 | Barros | .......... | 715/764 |
| 6,314,370 B1 * | 11/2001 | Curtright | ................ | 701/213 |
| 6,321,158 B1 * | 11/2001 | DeLorme et al. | ............. | 701/201 |
| 6,810,323 B1 | 10/2004 | Bullock et al. | | |
| 7,089,110 B2 * | 8/2006 | Pechatnikov et al. | ........ | 701/210 |
| 7,107,285 B2 * | 9/2006 | von Kaenel et al. | ....... | 707/104.1 |
| 7,142,205 B2 * | 11/2006 | Chithambaram et al. | .... | 345/418 |
| 7,509,215 B2 * | 3/2009 | Shen et al. | ................. | 701/211 |
| 7,616,217 B2 * | 11/2009 | Dayan et al. | ................. | 345/619 |
| 7,669,117 B2 * | 2/2010 | Albornoz et al. | ............ | 715/230 |
| 2001/0045949 A1 * | 11/2001 | Chithambaram et al. | .... | 345/418 |
| 2002/0194197 A1 * | 12/2002 | Flank | ................. | 707/104.1 |
| 2003/0041159 A1 * | 2/2003 | Tinsley et al. | ................ | 709/231 |
| 2003/0182052 A1 * | 9/2003 | DeLorme et al. | ............. | 701/201 |
| 2004/0125148 A1 * | 7/2004 | Pea et al. | ................. | 345/802 |
| 2005/0064858 A1 * | 3/2005 | Makela et al. | ................ | 455/419 |
| 2005/0144305 A1 * | 6/2005 | Fegan et al. | ................... | 709/231 |
| 2005/0262081 A1 * | 11/2005 | Newman | ............................. | 707/9 |
| 2006/0241860 A1 * | 10/2006 | Kimchi et al. | ................ | 701/208 |

FOREIGN PATENT DOCUMENTS

WO WO 0101370 * 1/2001

OTHER PUBLICATIONS

E. Bernier et al., "UMapIT: An On-Demand Web Mapping Tool Based on a Multiple Representation Database", 8th ICA Workshop on Generalisation, Jul. 7-8, 2005, pp. 1-9.*
GlobeXplorer "ImageBuilder Dynamic Server with Overlays Application Programmer's Interface (API) Documentation V4.4.1" 2006, pp. 1-82.* Zafer et al., "NetEdit: A Collaborative Editor," Thesis submitted to the Faculty of Virginia Polytechnic Institue and State University, Apr. 23, 2001.*
Toyama, K. et al., "Geographic location tags on digital images," Proceedings of the eleventh ACM international conference on Multimedia, 2003, pp. 156-166.
Egenhofer, M. "Spatial Information Appliances: A Next Generation of Geographic Information Systems," 1st Brazilian Workshop on GeoInformatics, 1999, 4 pages.

* cited by examiner

*Primary Examiner* — Maikhanh Nguyen
(74) *Attorney, Agent, or Firm* — Sterne, Kessler, Goldstein & Fox, P.L.L.C.

(57) ABSTRACT

Users can collaborate to annotate a map by sharing geographical information. Map data can be stored locally or remotely while annotations are stored in an annotation server. A presentation device such as a personal computer can use the map data to display a map and can access the annotations on the annotation server and display them. Different users can edit the annotations and save them on the annotation server. The annotations presented to users who are simultaneously viewing them can be synchronized. Presentation devices can download modules for sharing geographical information from servers such as web servers.

19 Claims, 6 Drawing Sheets

SHARING GEOGRAPHICAL INFORMATION BETWEEN USERS

TECHNICAL FIELD

Embodiments relate to the fields of geographic data and digital cartography. Embodiments also relate to the fields of information sharing and electronic collaboration.

BACKGROUND

Digital cartography, or mapping, is becoming increasingly popular as applications for it become less expensive. Publishers like digital cartography because maps can be displayed with the publisher's services and location highlighted. Travelers like it because they can obtain a customized map with a travel route from an origination to a destination. In general, geographic data, which is the basis for digital mapping is becoming more available. As it becomes more available, people discover more ways to use it.

Publishers have long used maps to direct customers to merchants. The maps are often printed on paper with annotations. An annotation is information that goes with a map. For example, a written street address or telephone number can help guide people to a merchant. An "X" or other icon can be printed on the map to graphically indicate a location. Digital maps can also have annotations. A person selects a map and annotates it. Another person can then view the annotated map. Travelers can also use an annotated map. A traveler's map can have annotations indicating waypoints, routes, and roadside services.

In the digital realm, annotated maps can be produced by anyone having access to geographic data. The specific map is usually application specific. As discussed above, a traveler's map differs from a publisher's map. Both types of maps, however, are produced and then published. They are commonly produced by a mapping tool or graphics application. They are often published by being printed, displayed on a computer screen, or presented on a cell phone screen.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Systems and methods that allow collaborative map production and publication can be realized by sharing geographic information between users.

It is therefore an aspect of the embodiments to provide a map module that can access map data and use the map data to display a map on a presentation device. The map data can be geographical data indicating roads, routes, or terrain. The geographic data can include an image of an area such as a satellite photo of a portion of the earth's surface. The map data can be stored locally within a device, such as a hard drive or memory chip, associated with the presentation device. The map data can alternatively be stored remotely in a map server that the presentation device can access. A web server can be used as a map server.

A map control can be used to pan, zoom, or otherwise adjust a map. Panning is a way of moving around on the map to see other parts. A person can zoom in to view fine details or zoom out to see the big picture. Other controls can be used to bring out other details such as to view a road map overlaying a satellite image or to view topographic details.

It is also an aspect of the embodiments to provide an annotation editing module. The annotation editing module can be used to create annotations or to edit annotations. An annotation is information that can be displayed in association with the map. An annotation can be a note pertaining generally to the map or can be registered to a map location. An annotation is registered to a map location when it must be displayed in a specific place relative to the mapped geography. For example, an "X" on a treasure map showing a treasure location is registered to the treasure location. The treasure map is less than helpful if the "X" is not registered to a map location and is thereby displayed at the wrong place. Map coordinates, such as the location's latitude and longitude, can be used to register annotations to map locations.

It is another aspect of the embodiments to provide an annotation viewing module. The presentation device can use the annotation viewing module to show the annotations around, overlying, or underlying the map. Annotations can overlie the map so that they are visible on top of the map versus being obscured by the map.

It is yet another aspect of the embodiments to associate a locator with the annotations. A locator can be used to access one or more annotations. For example, a person can create annotations indicating the locations of various friends' homes on a map. The person can then associate the locator "Buds" with the annotations. As such, "Buds" can be used to access the annotations, and thereby the map that is annotated. Alternatively, the person can store the annotated map at which time an automatically generated locator can be associated with the annotations. A locator can be associated with more than one annotation. Similarly, an annotation can be associated with more than one locator.

A uniform resource locator (URL) such as those commonly used for accessing web pages and data on the Internet is a locator. A person can create annotations, store them on a web server, and then publish one or more URLs. People can then use the URLs to access the annotations.

It is still yet another aspect of the embodiments to provide an annotation storage module that stores the annotations. As discussed above, locators can be used to access the annotations. A simple embodiment can store annotations in a file and use the locator as a file name. A more complicated embodiment can use a relational database to associate locators with annotations and to use the locators for accessing the annotations. A web server can act as an annotation server if the web server contains an annotation storage module or can otherwise access an annotation storage module. For example, a web server can remotely access annotations held in a relational database that is in a distant data center.

It is a further aspect of the embodiments to provide a communication network that users can use to access the annotations. The communications network can also be used to access remotely stored map data. One person can create an annotated map and tell another person what locator to use. The other person can then access the annotations and even use the annotation editing module to edit them.

An authentication server can be used to restrict access to the annotations. Access can be restricted based on passwords or membership in a group. Types of access can also be restricted. People who can view the annotations have viewing access. People who have editing access can edit the annotations. As such a group of people having editing access can collaborate to annotate a map.

A group of people can collaborate by simultaneously editing annotations. When one person changes an annotation, the other people can see the change. For example, an annotation editing module can store the change on the annotation server which is then sent, or pushed, to each person's annotation viewing module. Alternatively, each person's annotation viewing module can regularly contact the annotation server and download the changed annotations.

Access to the annotations can be logged. A log can show who accessed what annotation, when they accessed it, and what they did with it. For example, the log could show "Bob viewed Buds on Dec. 31, 2006 at 11:55 PM" and that "Dan edited Buds on Dec. 31, 2006 at 11:57 PM." Furthermore, a log can show what was done, such as what Dan did to the annotations associated with Buds.

A module server can be used to download modules such as the map module, the annotation editing module, the annotation viewing module, or the annotation storage module into a presentation device. For example, a module can be a java applet or javascript script stored on a web server. A person can use a web browser running on a computer to access the web server and download a module. The module can then be executed in the browser. Alternatively, a person can download a module that is an executable program from a server and then run it.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

Users can collaborate to annotate a map by sharing geographical information. Map data can be stored locally or remotely while annotations are stored in an annotation server. A presentation device such as a personal computer can use the map data to display a map and can access the annotations held on the annotation server and display them. Different users can edit the annotations and save them on the annotation server. The annotations presented to users who are simultaneously viewing them can be synchronized such that each user sees the same annotation. Presentation devices can download modules for sharing geographical information from servers such as web servers.

Architectural Overview

Figure 1:
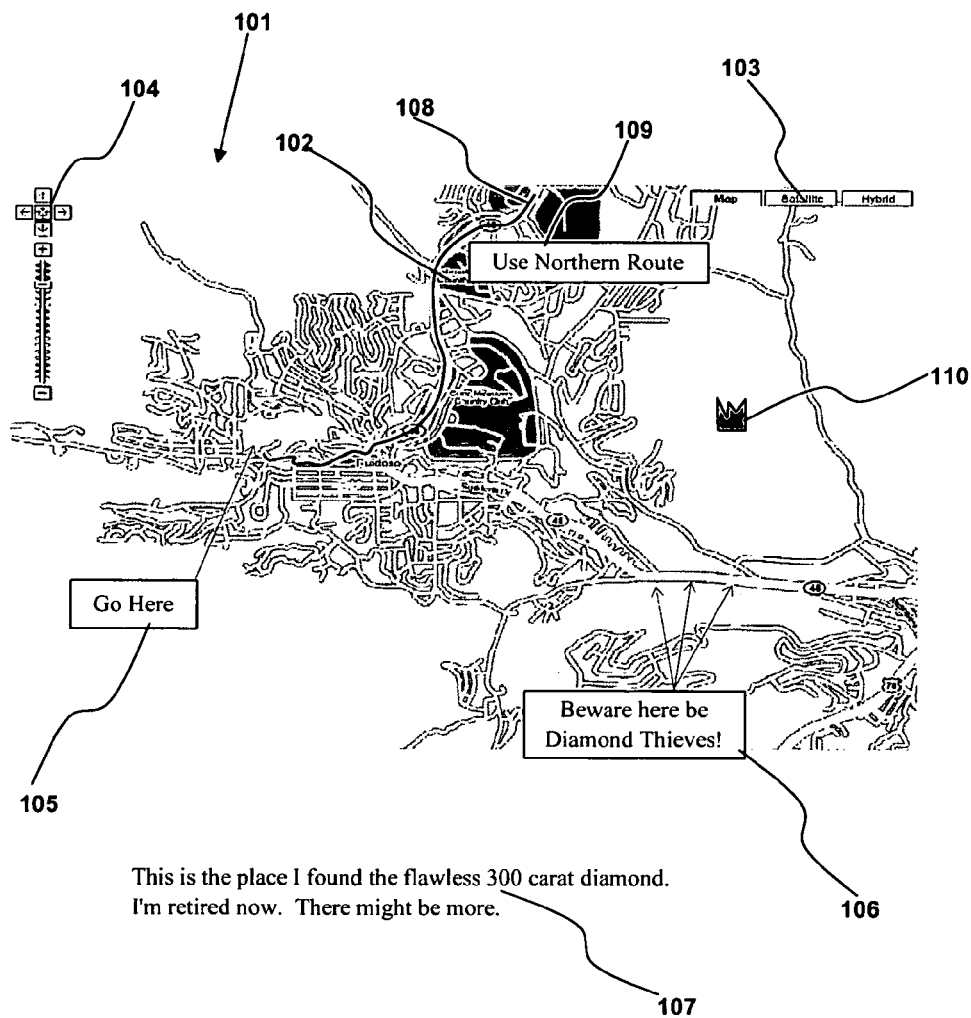
FIG. 1 illustrates an annotated map in accordance with aspects of the embodiments.

FIG. 1 illustrates an annotated map in accordance with aspects of the embodiments. A map 101 of Ruidoso, N. Mex. is presented. It has a pan and zoom control 104 and a presentation control 103. The presentation control 103 can be used to select between different views of the map 101. The view presented shows Ruidoso's roads. The satellite view is a satellite image of Ruidoso while the hybrid view has the road view overlying the satellite view.

The map 101 has labels identifying streets and parks such as the park label 102. Labels are distinguished from annotations here because users can not edit and collaborate on the labels. The labels are part of the map.

The "Go Here" 105 annotation is shown overlying the map 101 with an indication of where to go. The "Go Here" annotation is registered to the map 101 so that the desired location does not change on the map regardless of any panning or zooming. A second annotation 106 is registered to three map locations.

A third annotation 108 indicates a road. The third annotation 108 is a curve that follows the course of the road. A freehand pen tool or a polyline drawing tool can be used to create curves such as the third annotation 108. A fourth annotation 109 overlies the map 101 but does not need to be registered to a map location. A fifth annotation 107 appears below the map and is a general note.

The fire danger indicator 110 is a live annotation. A live annotation conveys changing information. The fire danger indicator 110 is an example of a live annotation that presents the level of fire danger in the area. Moving a mouse pointer over the fire danger indicator 110 can cause a text message explaining the fire danger indicator's meaning to be displayed. For example, mousing over the fire danger indicator 110 can cause the text "Fire Danger: Extreme" to be displayed. The actual data can be obtained from a live data source such as a Forest Service web site. As such, a user can place the fire danger indicator 110 on the map and the fire danger indicator will automatically change as the Forest Service changes the danger level. Other examples are wind speed and direction indicators that can be associated with wind monitoring equipment. The map can then present dynamically changing wind conditions. A live annotation can poll the data source at regular intervals or can receive data that the data source broadcasts.

Figure 2:
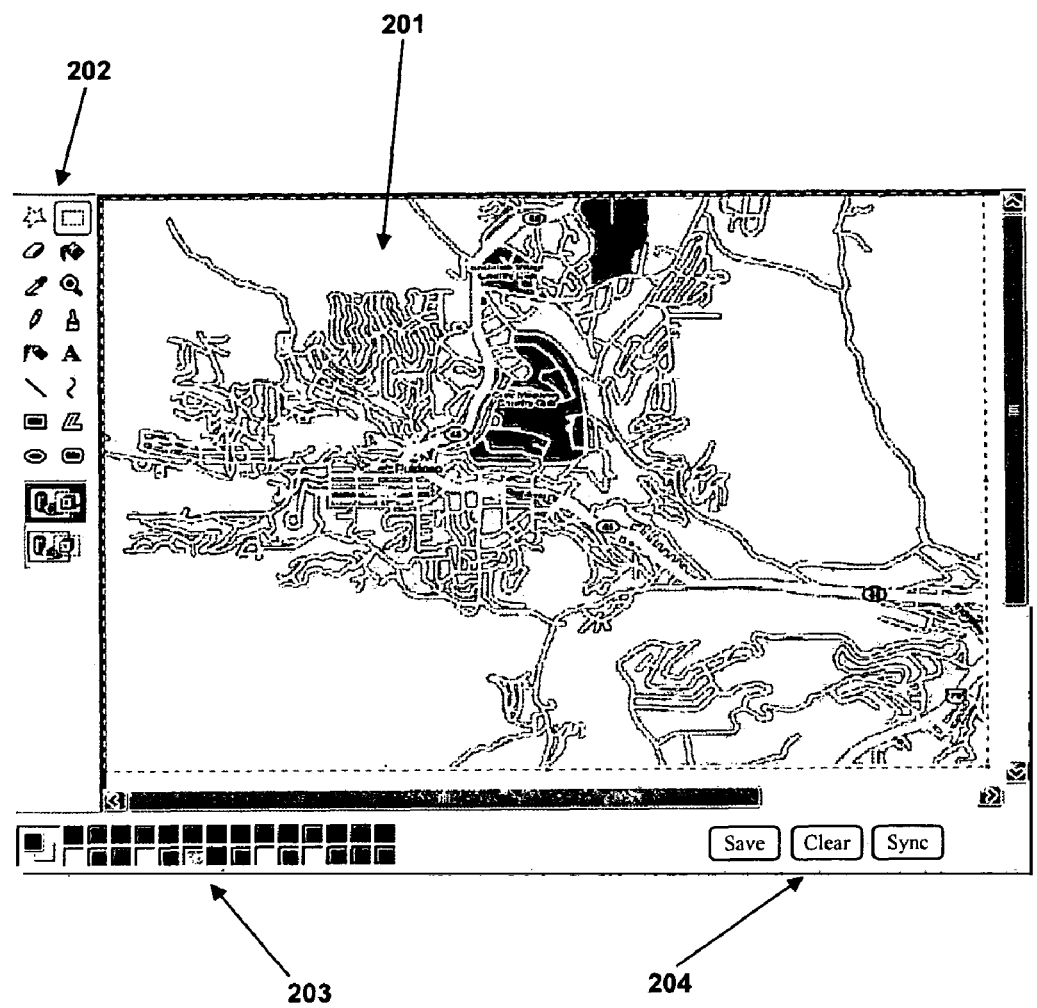
FIG. 2 illustrates an annotation editor in accordance with aspects of the embodiments.

FIG. 2 illustrates an annotation editor in accordance with aspects of the embodiments. A map 201 is presented in the editor. Standard drawing tools are presented in a tool palette 202. Those familiar with drawing or drafting on a computer are familiar with the tools presented as well as with many other tools. A color palette 203 can be used for selecting colors. Buttons 204 can be used to save annotations to the annotation server, to clear unsaved annotations, or to synchronize the annotations with those on the annotation server.

Figure 3:
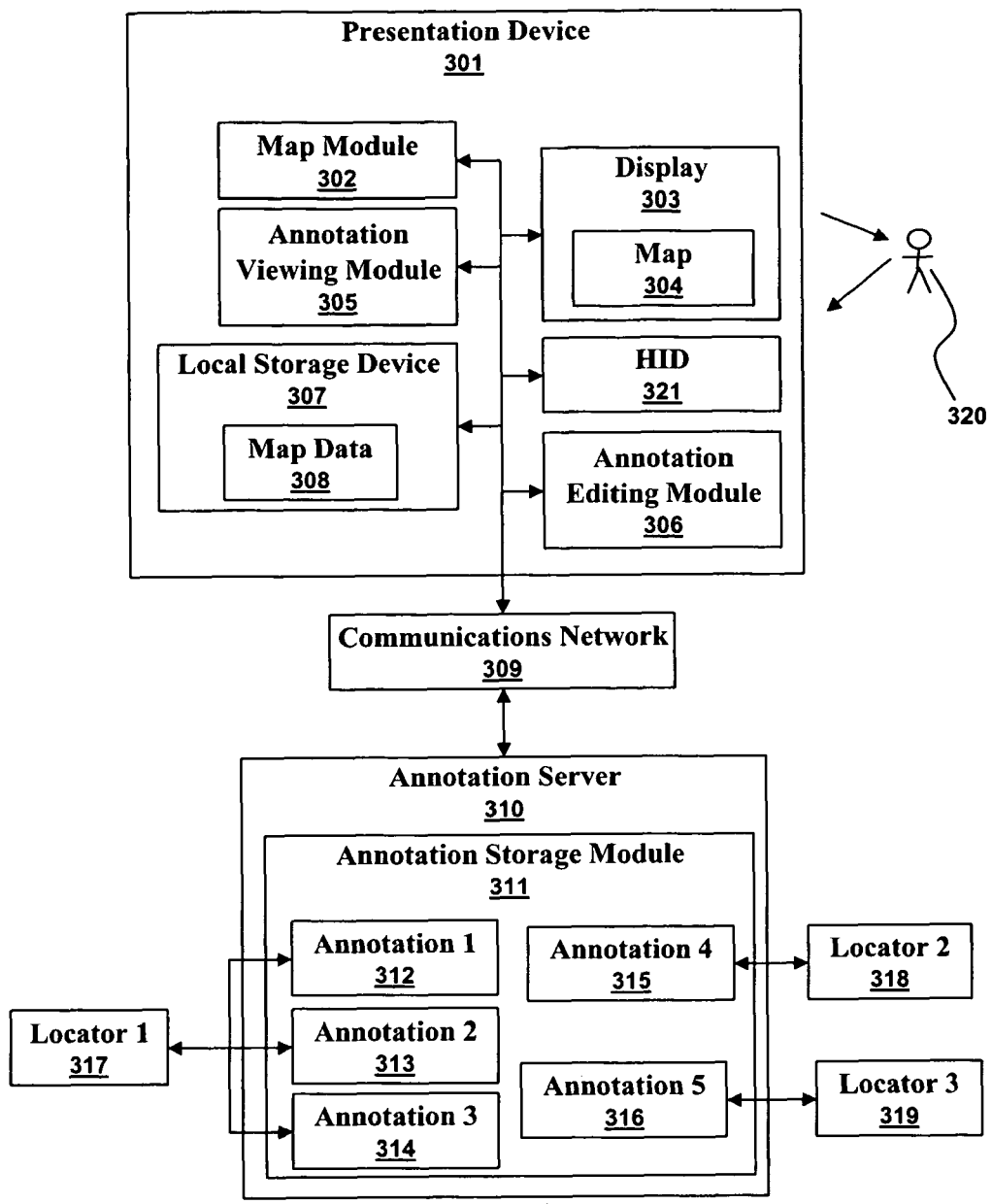
FIG. 3 illustrates a high level block diagram of a system for sharing geographical information between users in accordance with aspects of the embodiments.

FIG. 3 illustrates a high level block diagram of a system for sharing geographical information between users in accordance with aspects of certain embodiments. A user 320 uses a presentation device 301 by viewing its display 303 and manipulating its human interface device (HID) 321. The presentation device also has a map module 302, annotation module 305, a local storage device 307 and an annotation editing module 306. The map module 302 uses map data 308 obtained from the local storage device 307 to present a map 304 on the display 303. If the map 304 is interactive, meaning it has a map control, the user 320 can use the HID 321 to control the map 304.

The annotation viewing module 305 can use the communications network 309 to contact the annotation server 310 to obtain annotations. The annotations can be displayed with the map 304 on the display device 303. The annotation editing module 306 can store annotations on the annotation server 310.

The annotation server is shown having an annotation storage module 311 containing annotation 1 312, annotation 2 313, annotation 3 314, annotation 4 315, and annotation 5 316. Locator 1 317 is associated with annotation 1 312, annotation 2 313, and annotation 3 314. Locator 2 318 is associated with annotation 4 315 and Locator 3 is associated with annotation 5 316. The locators can be used to access the annotations.

Figure 4:
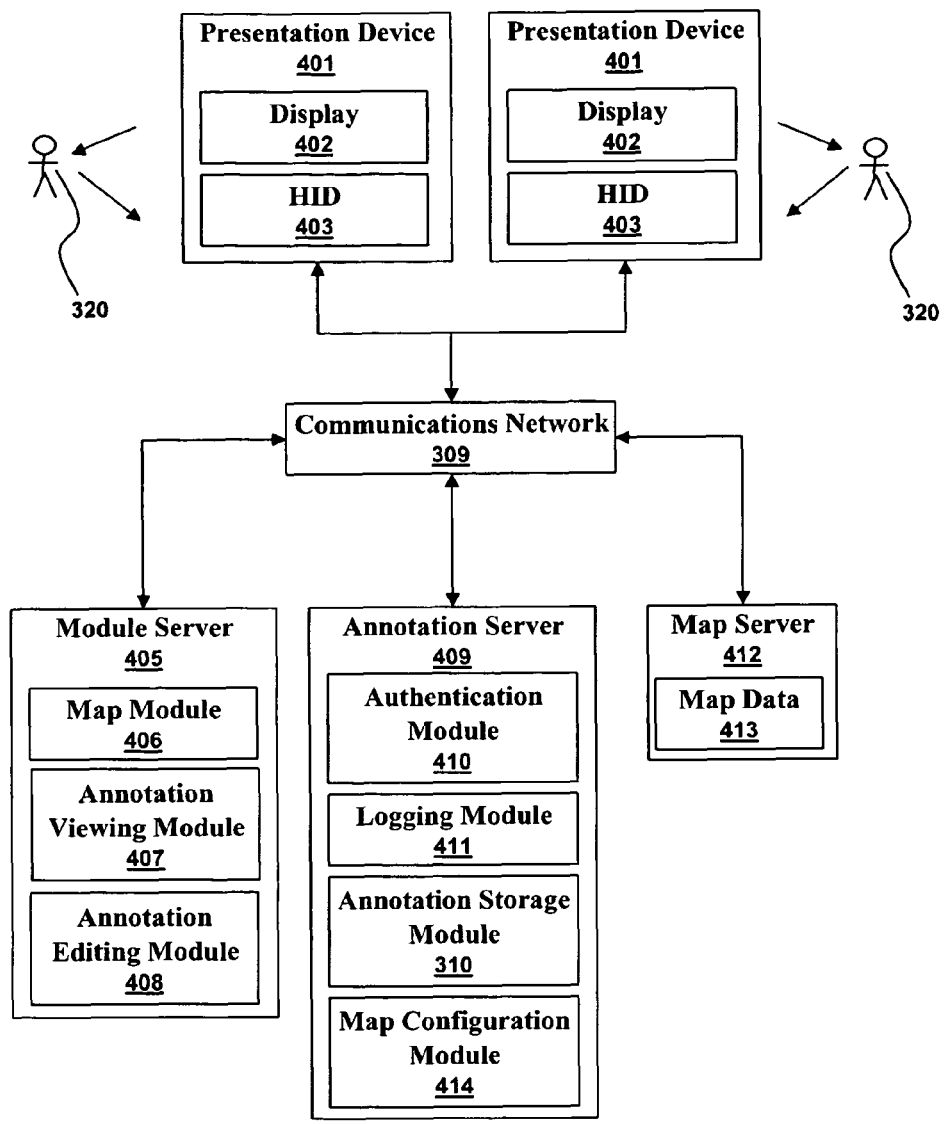
FIG. 4 illustrates a high level block diagram of another system for sharing geographical information between users in accordance with aspects of the embodiments.

FIG. 4 illustrates a high level block diagram of another system for sharing geographical information between users in accordance with aspects of certain embodiments. The presentation devices 401 have HIDs 403 and displays 402. The users 320 can use the presentation devices 401 to access the module server 405 and download individual copies of the map module 406, annotation viewing module 407 and annotation editing module 408. The modules can be executed in the presentation devices 401. For example, the presentation devices 401 can be personal computers and the users 320 can use web browsers to obtain and run the modules.

The map module 406, once running in a presentation device 401, can access the map data in the map server 412. The map module 406 can then use the map data 413 to display a map to a user 320. Similarly, the annotation viewing module 407 can access the annotations in the annotation server 409 and present them to a user 320.

The annotation editing module 408, once running in a presentation device 401, can be used to create, edit, and delete annotations. The annotations can then be stored to, or deleted from, the annotation storage module 310 in the annotation server 409. The logging module 411 logs the annotation creations, edits, and deletions. The authentication module 410 restricts access to the annotations.

After an author annotates a map, the annotations can be stored so that other users can access them. The other users, however, often need some viewing parameters as guidance for displaying the mapped location. A mapped location can be specified by a center point and a scale. For example, the center can be Ruidoso, N. Mex. and the scale can be selected so that the map shows a 50 square mile area around the center. The viewing parameters can also include orientation or enable/disable various layers of information such as roads, topological height lines, school locations, and other information. The viewing parameters can be embedded in the annotations, in a uniform resource locator (URL), or obtained from a map configuration module 414.

A URL can be used to access viewing parameters. A user can enter the URL into a web browser. The viewing parameters can also contain the annotations. The annotations can be directly contained in the viewing parameters, in which case the annotation server 409 and the viewing parameter server are essentially the same server. The viewing parameters can indirectly contain the annotations by using locators, such as URLs, that can be used to access the annotations.

For example, an author creates annotations, stores them, and obtains a uniform resource locator (URL) that can be used to view the annotated map. The author can publish the URL so that other people can enter the URL into a web browser and view the author's annotated map. The URL can contain information describing the viewing parameters. Alternatively, the URL can contain information that can be used to obtain viewing parameters from a map configuration module 414. The map configuration module 414 is illustrated as within the annotation server 409 although it could just as easily be within the map server 412, a dedicated server, or elsewhere within the system.

Figure 6:
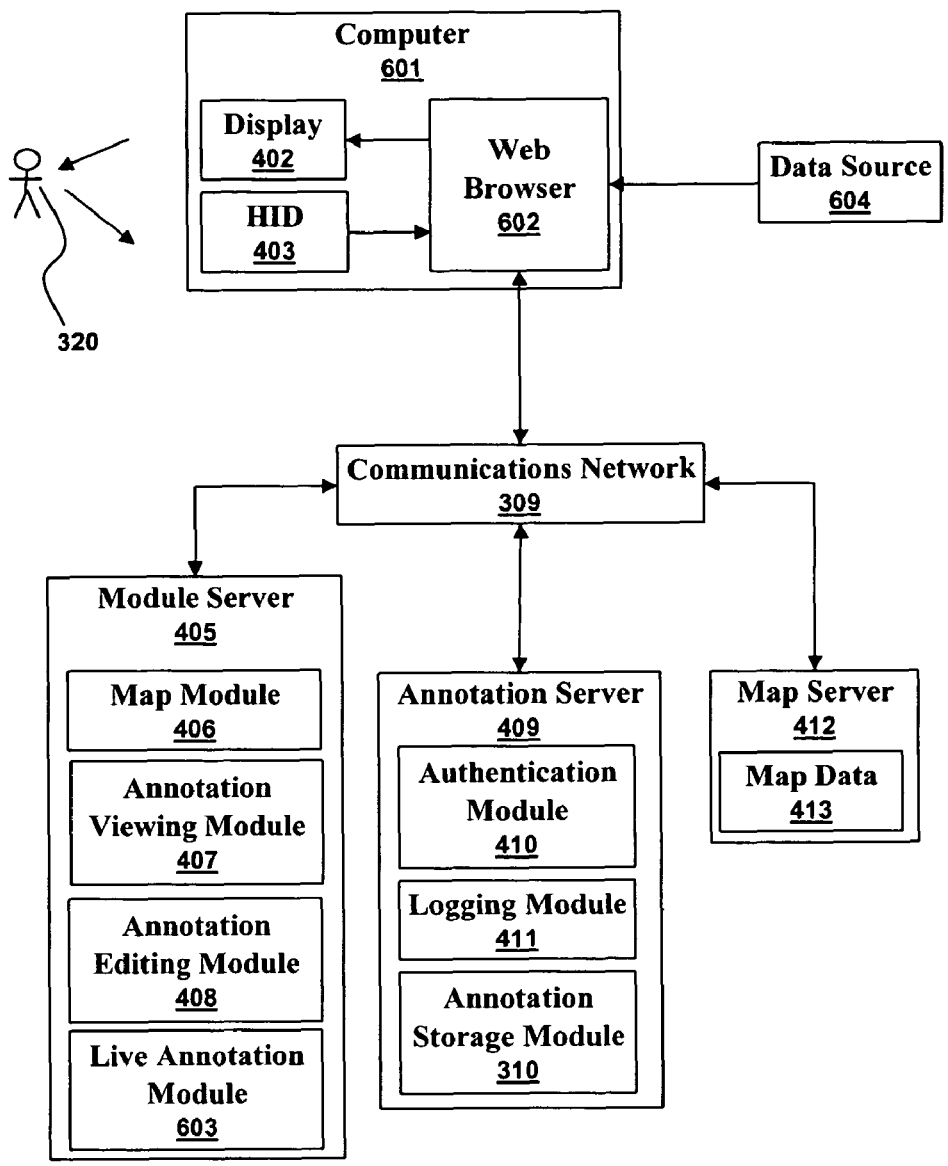
FIG. 6 illustrates a high level block diagram of a system for sharing geographical information between users with web browsers in accordance with aspects of the embodiments.

FIG. 6 illustrates a high level block diagram of a system for sharing geographical information between users with web browsers in accordance with aspects of the embodiments. FIG. 6 illustrates a special case of the system of FIG. 3. In FIG. 6, the presentation device is a computer 601 running a web browser 602. The web browser 602 can obtain the modules from the module server 405 and run them. Alternatively, the web browser 602 can access a server, such as the annotation server 409 or map server 412, which then runs the module and sends information to the web browser 602. A server side script is an example of a module that a server runs in response to a web browser request for obtaining data that is returned in the servers' response. In general, a module can be run on either a server or on a client. The web browser 602 can access annotations on the annotation server 409 and map data 413 on the map server 412.

FIG. 6 also illustrates a live annotation module 603 that the web browser 602 can obtain from the module server 405. The web browser 602 can display the live annotation and update the appearance of the live annotation based on data obtained from a data source 604. The annotation server 409 or any other server can be used to serve the live annotation module 603, the choice of server is an implementation detail.

High Level Process Flow

Figure 5:
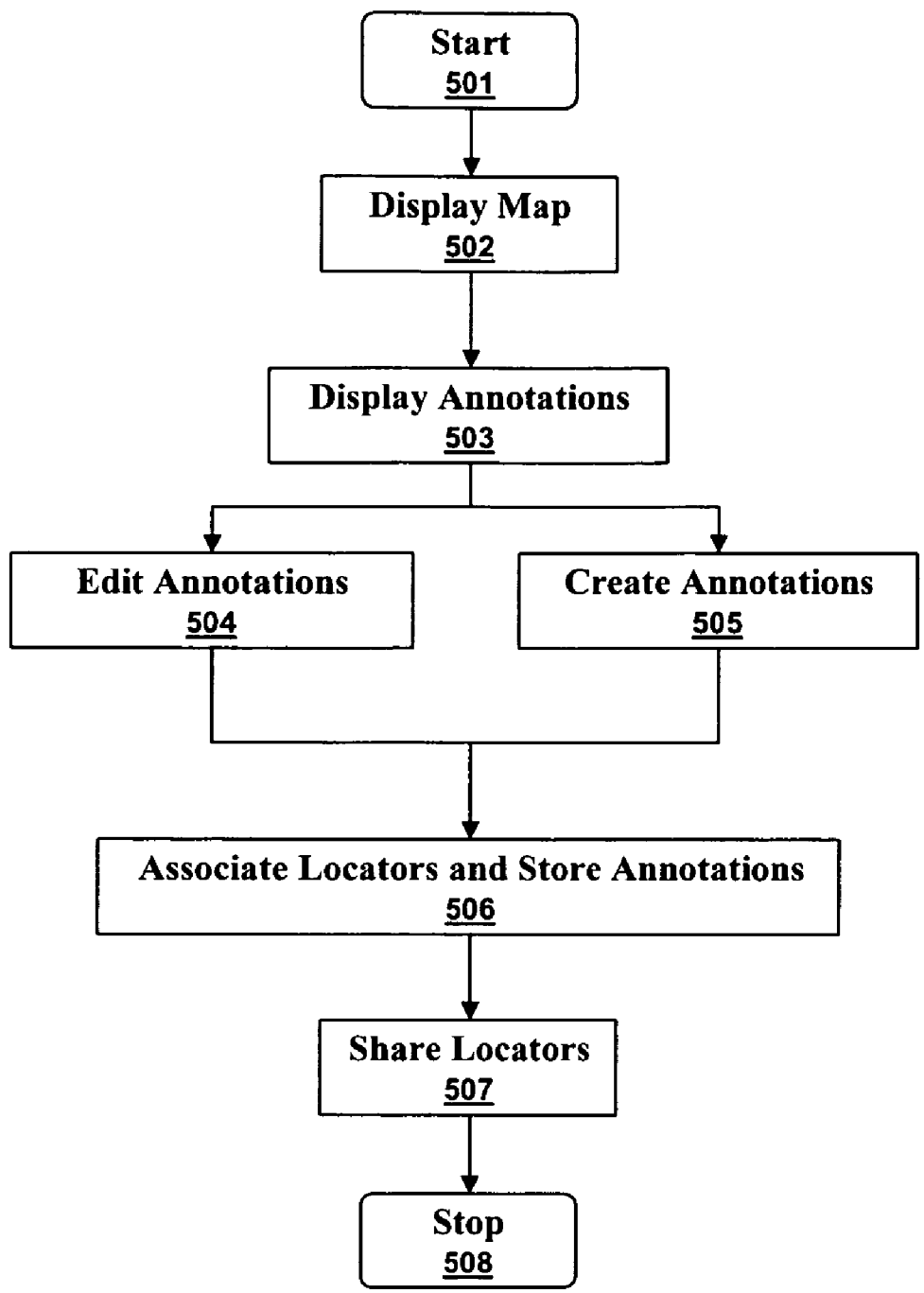
FIG. 5 illustrates a high level flow diagram of sharing geographical information between users in accordance with aspects of the embodiments.

FIG. 5 illustrates a high level flow diagram of sharing geographical information between users in accordance with aspects of certain embodiments. After the start 501 the map is displayed 502 and the annotations are displayed 503. A user can then create new annotations 505 or edit existing annotations 504. The annotations can then be associated with locators and stored 506 in an annotation storage module. A user can then share the locators 507 so that other users can collaborate on the annotations. The process can then stop 508.

General

Embodiments can be implemented in the context of modules. In the computer programming arts, a module (e.g., a software module) can be implemented as a collection of routines, data structures, firmware and hardware that perform particular tasks or implement a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system including at least one processor for displaying a map with annotations on a presentation device comprising:
    a map module that accesses map data and uses the map data to display a map on the presentation device;
    an annotation editing module that is used to create at least one annotation and wherein the editing module is used to edit the at least one annotation;
    an annotation viewing module wherein the presentation device uses the annotation viewing module to present the at least one annotation overlying the map and wherein the at least one annotation is registered to a map location;
    at least one locator wherein the at least one annotation is associated with the at least one locator;
    a live annotation module and at least one data source wherein the live annotation module obtains data from the data source that has automatically changed and dynamically updates a live annotation displayed on the presentation device in association with the map with the automatically changed data; and
    an annotation storage device that stores the at least one annotation wherein a particular locator is used to access every annotation stored in the storage device that is also associated with the particular locator, and wherein at least two users can simultaneously edit and view the at least one annotation via a communication network.

2. The system of claim 1, wherein the at least one locator is associated with two or more locations on the map and wherein each location is associated with one or more annotations.

3. The system of claim 1 further comprising a map server wherein the map module obtains the map data from the map server.

4. The system of claim 1 further comprising a module server wherein the presentation device obtains at least one module from the module server.

5. The system of claim 1 further comprising an annotation server.

6. The system of claim 1 further comprising at least one map control that can be used to interact with the map.

7. The system of claim 1 further comprising an authentication module that can be used to restrict access to at least one of the at least one annotation.

8. The system of claim 7 wherein editing access is restricted.

9. The system of claim 1 further comprising:
    a map server wherein the map module obtains the map data from the map server;
    a module server wherein the presentation device obtains at least one module from the module server;
    an annotation server and a logging module;
    an authentication module that can be used to restrict access to at least one of the at least one annotation; and
    at least one map control that can be used to interact with the map.

10. A method for displaying a map with annotations on a presentation device comprising:
    displaying a map on a presentation device, wherein the map comprises one or more map locations:
    displaying one or more original annotations wherein each of the one or more original annotations is registered to a first map location of the one or more map locations;
    providing an edit control for a user to edit the one or more original annotations;
    providing a create control for the user to create one or more new annotations wherein each of the one or more new annotations is registered to a second map location of the one or more map locations and wherein at least one annotation comprises the one or more new annotations and the one or more original annotations;
    providing a locator control for the user to associate a locator with the at least one annotation to create at least one located annotation;
    storing the at least one located annotation in a storage module wherein the locator can be used to access the at least one located annotation;
    obtaining data from a data source that has automatically changed;
    dynamically updating live annotation displayed on the map with the automatically changed data from the data source: and
    sharing the locator such that at least two users can simultaneously access, view, and edit the at least one located annotation wherein the at least one located annotation is registered to the map location and is viewed overlying the map.

11. The method of claim 10 further comprising obtaining map data from a local storage device wherein the map data is used to display the map.

12. The method of claim 10 further comprising obtaining map data from a map data server wherein the map data is used to display the map.

13. The method of claim 10 further comprising obtaining at least one module from a module server wherein the presentation device runs the at least one module.

14. The method of claim 10 further comprising obtaining a shared annotation from an annotation server wherein the shared annotation is one of the at least one annotation.

15. The method of claim 10 further comprising providing at least one map control that can be used to interact with the map.

16. The method of claim 10 further comprising restricting access to at least one of the at least one annotation.

17. The method of claim 16 wherein editing access is restricted.

18. The method of claim 10 further comprising logging the creation, editing, and deletion of the at least one annotation.

19. The method of claim 10 wherein the second map location is the same as the first map location.

* * * * *

UNITED STATES PATENT AND TRADEMARK OFFICE
CERTIFICATE OF CORRECTION

| | | |
|---|---|---|
| PATENT NO. | : 8,122,341 B1 | Page 1 of 1 |
| APPLICATION NO. | : 11/454243 | |
| DATED | : February 21, 2012 | |
| INVENTOR(S) | : Dayan et al. | |

It is certified that error appears in the above-identified patent and that said Letters Patent is hereby corrected as shown below:

In the Claims:

Column 8, Line 9, Claim 10, please replace "locations:" with --locations;--.

Column 8, Line 31, Claim 10, please replace "source: and" with --source; and--.

Signed and Sealed this
Tenth Day of July, 2012

David J. Kappos
*Director of the United States Patent and Trademark Office*